US012523362B2

(12) United States Patent
Lande

(10) Patent No.: US 12,523,362 B2
(45) Date of Patent: Jan. 13, 2026

(54) FLEXIBLE COMPONENTIZED LIGHT ENGINE

(71) Applicant: Disney Enterprises, Inc., Burbank, CA (US)

(72) Inventor: Galen R. Lande, Davenport, FL (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 18/665,072

(22) Filed: May 15, 2024

(65) Prior Publication Data

US 2025/0354680 A1 Nov. 20, 2025

(51) Int. Cl.

| | |
|---|---|
| ***F21V 23/00*** | (2015.01) |
| ***F21V 23/04*** | (2006.01) |
| ***F21V 23/06*** | (2006.01) |
| *F21Y 105/16* | (2016.01) |
| *F21Y 115/10* | (2016.01) |

(52) U.S. Cl.

CPC ........ *F21V 23/005* (2013.01); *F21V 23/0457* (2013.01); *F21V 23/06* (2013.01); *F21V 2200/00* (2015.01); *F21Y 2105/16* (2016.08); *F21Y 2115/10* (2016.08)

(58) Field of Classification Search

CPC ..... F21V 23/005; F21V 23/0457; F21V 23/06

See application file for complete search history.

(56) References Cited

U.S. PATENT DOCUMENTS

| | | | | |
|---|---|---|---|---|
| 8,299,719 | B1 * | 10/2012 | Moshirnoroozi | H05B 47/165 315/318 |
| 10,066,795 | B2 | 9/2018 | Li et al. | |
| 11,089,662 | B2 * | 8/2021 | Brinkman | G06F 3/0202 |
| 11,609,039 | B2 * | 3/2023 | Thomas | A47F 11/10 |
| 11,906,144 | B1 * | 2/2024 | Loomis | F21V 23/04 |
| 12,177,969 | B2 * | 12/2024 | Hodges | H05K 3/368 |
| 12,238,832 | B2 * | 2/2025 | Zhang | H05B 45/20 |
| 2010/0060205 | A1 * | 3/2010 | Vaassen | H05B 45/48 438/23 |
| 2016/0057819 | A1 * | 2/2016 | Wang | H05B 45/20 315/294 |
| 2020/0200348 | A1 * | 6/2020 | Romero | H01S 5/4025 |
| 2021/0270431 | A1 * | 9/2021 | John | F21S 4/28 |
| 2023/0189409 | A1 | 6/2023 | Xiong et al. | |
| 2024/0093859 | A1 | 3/2024 | Li et al. | |

FOREIGN PATENT DOCUMENTS

| | | | |
|---|---|---|---|
| CN | 210107130 | U | 2/2020 |
| CN | 217109437 | U | 8/2022 |
| CN | 219248138 | U | 6/2023 |
| JP | 2013535076 | A | 9/2013 |
| WO | 2015129973 | A1 | 9/2015 |

* cited by examiner

*Primary Examiner* — Christopher E Dunay

(74) *Attorney, Agent, or Firm* — Dorsey & Whitney LLP

(57) ABSTRACT

A light device, a lighting apparatus, and a system including a controller and multiple light devices are described. An example light device includes a printed circuit board (PCB), an input connector disposed at a first side of the PCB, an output connector disposed at second side of the PCB, one or more light engines disposed on the PCB between the input connector and the output connector, and one or more drivers disposed on the PCB. Each light engine of the one or more light engines includes multiple light emitting diodes (LEDs). Each driver of the one or more drivers is configured to control illumination emitted from a respective light engine of the one or more light engines.

19 Claims, 11 Drawing Sheets

FLEXIBLE COMPONENTIZED LIGHT ENGINE

INTRODUCTION

The present disclosure generally relates to lighting. More specifically, embodiments disclosed herein provide a flexible, modular, light device with one or more light engines.

Light emitting diode (LED) technology is used in a wide variety of applications, including entertainment applications, residential applications, commercial applications, and industrial applications, as illustrative examples. In many entertainment applications, LED technology may be used to provide lighting effects for themed entertainment attractions, theatrical productions, show sets, stages, displays, and props, as illustrative examples. In such applications, the lighting effects are generally created by LED devices, such as LED tape, LED light strips, and LED rope lights, as illustrative examples.

SUMMARY

One embodiment described herein is a light device. The light device includes: a printed circuit board (PCB), an input connector disposed at a first side of the PCB, and an output connector disposed at second side of the PCB. The light device also includes one or more light engines disposed on the PCB between the input connector and the output connector, each light engine of the one or more light engines comprising a plurality of light emitting diodes (LEDs). The light device further includes one or more drivers disposed on the PCB, each driver of the one or more drivers being configured to control illumination emitted from a respective light engine of the one or more light engines.

Another embodiment described herein is a lighting apparatus. The lighting apparatus includes a plurality of light devices. Each light device of the plurality of light devices includes: a printed circuit board (PCB); an input connector disposed at a first side of the PCB; an output connector disposed at second side of the PCB; a light engine disposed on the PCB between the input connector and the output connector, the light engine comprising a plurality of light emitting diodes (LEDs); a driver configured to control illumination emitted from the light engine; a light pipe having a first portion disposed on and aligned with the light engine and having a second portion disposed above the output connector, the light pipe being configured to pass light emitted from the plurality of LEDs of the light engine from the first portion to the second portion; and a housing attached to the PCB and forming an enclosure around the input connector, the output connector, the light engine, the driver, and the first portion of the light pipe.

Another embodiment described herein is a computer-implemented method. The computer-implemented method includes detecting, by a controller, an error state associated with a lighting configuration comprising a plurality of light devices. Each light device includes (i) at least one light engine comprising a plurality of light emitting diodes (LEDs) and (ii) at least one driver for controlling the at least one light engine. The computer-implemented method also includes, responsive to the detection, sending, by the controller, a command to turn off one or more of the light engines.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1:
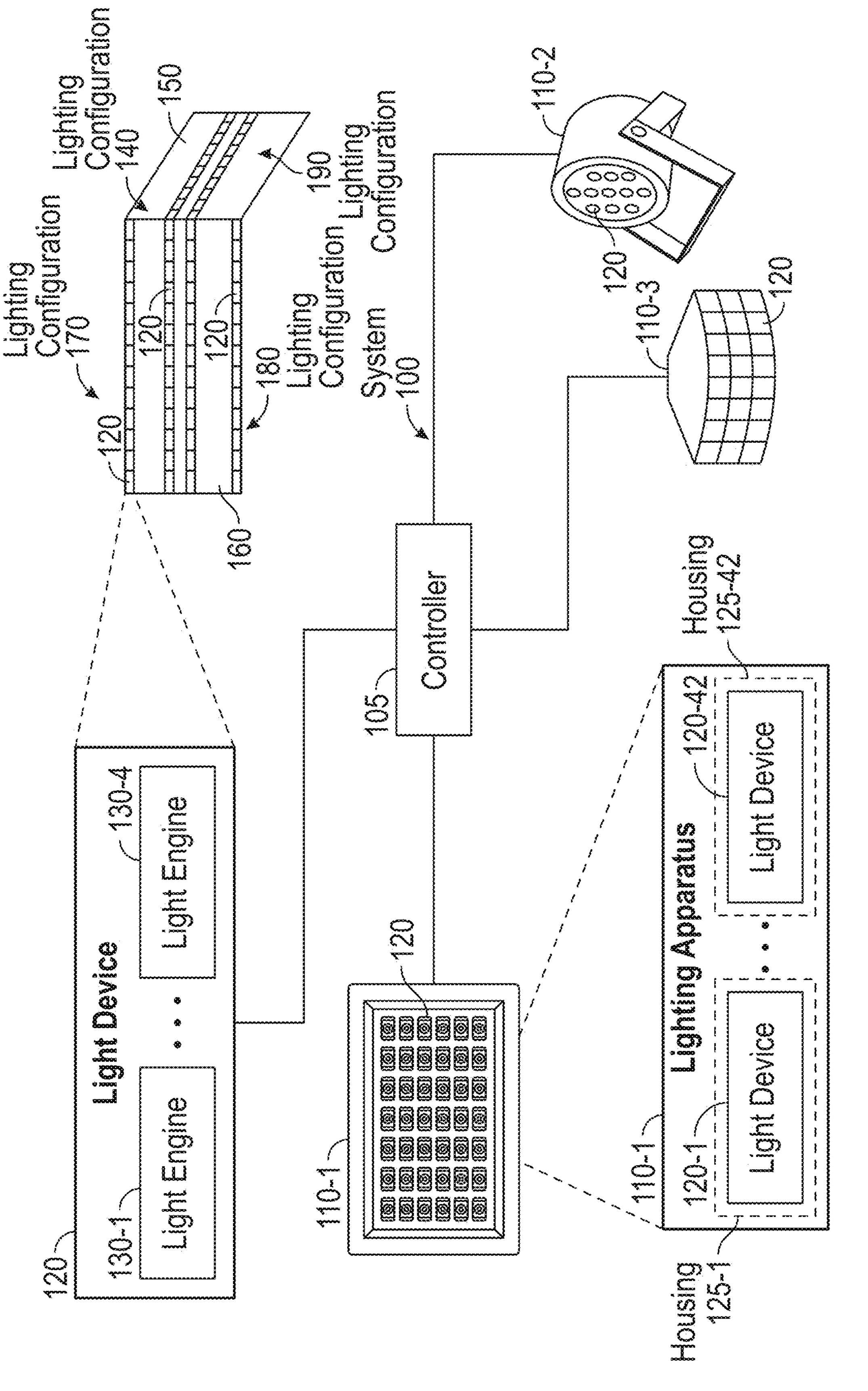
FIG. 1 illustrates an example lighting system, according to one embodiment.

Today, existing LED light devices used in many entertainment applications (e.g., themed entertainment attractions, concerts, theatrical productions, show sets, props, etc.) and other applications (e.g., residential, commercial, etc.) are generally low quality, mass produced LED tape or LED module style devices. Such devices, however, may have a number of drawbacks that make them unsuitable and unreliable for certain applications (e.g., entertainment applications).

For example, such devices may have a limited color gamut (e.g., range of colors that can be created) that is not tuned for stage lighting, object lighting, backdrop illumination, and other lighting effects typically used in entertainment applications and other applications. Additionally, using multiple LED devices of the same and/or different form factors together may introduce illumination matching problems (e.g., different devices may not emit matching colors) which can take a significant amount of time to address. Additionally, in many cases, there may be a limited number of remote drivers that are compatible with conventional LED light devices, as such devices may be designed to interact with proprietary remote drivers and control protocols. Additionally, the life span of conventional LED light devices may be limited by a lack of thermal management for such devices. Further, in many cases, when a single LED in a conventional LED light device (e.g., LED string) fails, often the entire LED light device will fail or the device may behave in an unexpected manner (e.g., create a strobe effect) that compromises the overall quality of the illumination effect. In such cases, the entire LED light device (e.g. LED string) may have to be replaced, a process that can be complicated and time-consuming for many entertainment installations.

Embodiments described herein provide a flexible, modular, componentized, and highly reliable light device that can used in a variety of applications, such as entertainment applications, residential applications, commercial applications, and others. The light device described herein may alleviate and/or address one or more of the aforementioned drawbacks associated with conventional LED devices.

For example, as described below, certain embodiments of the light device may include one or more light engines that can be designed to emit illumination customized for a particular application. For entertainment applications, for example, each light engine may include a set of LEDs that have a higher wide color gamut (e.g., a higher color rendering index (CRI)), allowing tuning for various lighting effects generally used in entertainment applications (e.g., stage lighting, object lighting, backdrop illumination, etc.). Additionally, certain embodiments of the light device described herein may have onboard driver hardware, eliminating the need for proprietary drivers, and may have built-in thermal management, allowing the light device to have an extended life span relative to conventional LED devices. Each light device described herein may be individually controlled via the on-board driver, allowing for individually controlling the illumination of the light device as well as turning off the light device in the case of failure or unexpected behavior.

Additionally, certain embodiments of the light device described herein may have a modular form factor that allows the light device to be used individually or in combination with other light devices in different lighting configurations (e.g., chain configuration, string configuration, and other configurations). The modularity of the light devices described herein may allow for any light device within a configuration of light devices to be easily replaced without replacing the entire configuration. That is, the failure of a single light device may not lead to failure of the entire configuration. In certain embodiments, rather than replacing a light device, the light device may be turned off, e.g., via the on-board driver, to prevent unexpected behavior.

Note that while many of the embodiments described herein use entertainment applications as an illustrative example of applications in which the light device described herein can be implemented, the light device described herein is not limited to entertainment applications; other applications are contemplated. For example, the light device described herein can be used in residential applications, commercial applications, industrial applications, and other applications involving illumination.

As used herein, a hyphenated form of a reference numeral refers to a specific instance of an element and the unhyphenated form of the reference numeral refers to the collective element. Thus, for example, device "12-1" refers to an instance of a device class, which may be referred to collectively as devices "12" and any one of which may be referred to generically as a device "12".

As used herein, the term "connected with" or "connected to" in the various tenses of the verb "connect" may mean that element A is directly connected to element B or that other elements may be connected between elements A and B (i.e., that element A is indirectly connected with element B). In the case of electrical components, the term "connected with" or "connected to" may also be used herein to mean that a wire, trace, or other electrically conductive material is used to electrically connect elements A and B (and any components electrically connected therebetween).

FIG. 1 illustrates an example illumination system 100 (hereinafter referred to as "system 100"), according to various embodiments. The system 100 may be located in any environment, such as an indoor environment, outdoor environment, or other environment types (e.g., blended indoor/outdoor environment, such as partially enclosed stadium). In certain embodiments, the system 100 may be used for a variety of entertainment applications, such as a themed entertainment attraction (e.g., line queue), theatrical/production stage, show set, and stage prop, as illustrative, non-limiting examples.

As shown, the system 100 includes a variety of lighting apparatuses 110-1 to 110-3 (collectively lighting apparatuses 110) that may be used for various entertainment applications. Each lighting apparatus 110 is generally configured to create an illumination (or lighting) effect using one or more light devices 120. The lighting apparatuses 110 may have various form factors, may be moveable or fixed, and may be deployed in various locations (e.g., floor, ceiling, wall, and other structures). In certain embodiments, each lighting apparatus 110 may provide structure (e.g., panel, board, etc.) for deploying (e.g., attaching) one or more of the light devices 120, which may be (partially or fully) integrated within the lighting apparatus 110 or disposed on the lighting apparatus 110. In the example depicted in FIG. 1, the lighting apparatuses 110-1 to 110-3 include a display panel (e.g., lighting apparatus 110-1), a stage lighting device (e.g., lighting apparatus 110-2), and a field lighting device (e.g., lighting apparatus 110-3). Each lighting apparatus 110 may include any number of light devices suitable for generating a desired illumination effect. In FIG. 1, for example, lighting apparatus 110-1 includes a configuration of forty-two light devices (e.g., light devices 120-1 to 120-42).

The light device(s) 120 may be flexible, modular, componentized, and highly reliable devices that can be deployed in multiple different configurations to create illumination effects for different applications. In some embodiments, one or more of the light devices 120 may be at least partially enclosed within a housing 125. In lighting apparatus 110-1, for example, light devices 120-1 to 120-42 may be (partially or fully) enclosed within respective housings 125-1 to 125-42. Additionally, in certain embodiments, the form factors of the light devices 120 within a given lighting apparatus 110 may be the same or different. Using lighting apparatus 110-1 as an illustrative example, light device 120-1 may have a different form factor (or configuration) than at least one of the remaining light devices (e.g., light device 120-2) and may have a same form factor as at least another one of the remaining light devices (e.g., light device 120-3).

In certain embodiments, the light devices 120 may be deployed in a configuration without an enclosure. In the example depicted in FIG. 1, multiple different sets of light devices 120 may be connected together to form different lighting configurations 140, 170, 180, and 190. Lighting configuration 180 includes a set of light devices 120 deployed at the bottom of a wall 160, e.g., to create illumination effects such as uplighting. Similarly, lighting configuration 170 includes another set of light devices 120 deployed at the top of the wall 160, e.g., to create illumination effects such as downlighting. In another example, lighting configurations 140 and 190 may be used to create a channel lighting effect on the walls 160 and 150. Similar to illustrative example of lighting apparatus 110-1, the form factors of the light devices 120 within a given lighting configuration 140, 170, 180, and 190 may be the same or different.

Each light device 120 may include, without limitation, one or more light engines 130 and other components described in greater detail herein. Each light engine 130 may include one or more LEDs. The number of light engines 130 within a light device 120 may be based on the form factor of the light device 120. For example, certain light devices 120 may include four light engines (e.g., light engine 130-1 to 130-4), whereas other light devices 120 may include a single light engine 130. Note, however, that these are merely examples, and that a light device 120 described herein may include any number of light engines 130. As described in greater detail below, even in embodiments where different form factors of light devices 120 are used within a lighting configuration or lighting apparatus, the spacing between light engines 130 may be maintained, such that the light engines 130 are aligned with each other. By enabling a consistent line spacing throughout a given configuration/lighting apparatus, embodiments herein may allow light devices 120 to be used for lighting effects in which pixel alignment is crucial (e.g., LED displays).

The system 100 also includes a controller 105 which is communicatively coupled to the light devices 120 within the various lighting apparatuses 110 and lighting configurations 140, 170, 180, and 190. The controller 105 may be communicatively coupled to the light devices 120 via a wired or wireless interface. The controller 105 is generally representative of a computing system that can control the intensity, color, and other parameters of the light engines 130 within each light device 120. As described in greater detail below, the controller 105 may use data signals in accordance with a lighting control protocol (e.g., Digital Multiplex (DMX) protocol, such as DMX512) to control the functionality of the light engines 130 within each light device 120. Note the controller 105 is described in greater detail with respect to FIG. 2.

Note that FIG. 1 depicts an illustrative example of an illumination system 100 in which one or more of the light devices 120 described herein can be implemented and that the light devices 120 described herein can be implemented in other systems and/or environments. For example, while the system 100 is shown with a certain number of lighting apparatuses, lighting configurations, light devices, and controllers, the system 100 may include any number of lighting apparatuses, lighting configurations, light devices, and controllers.

Figure 2:
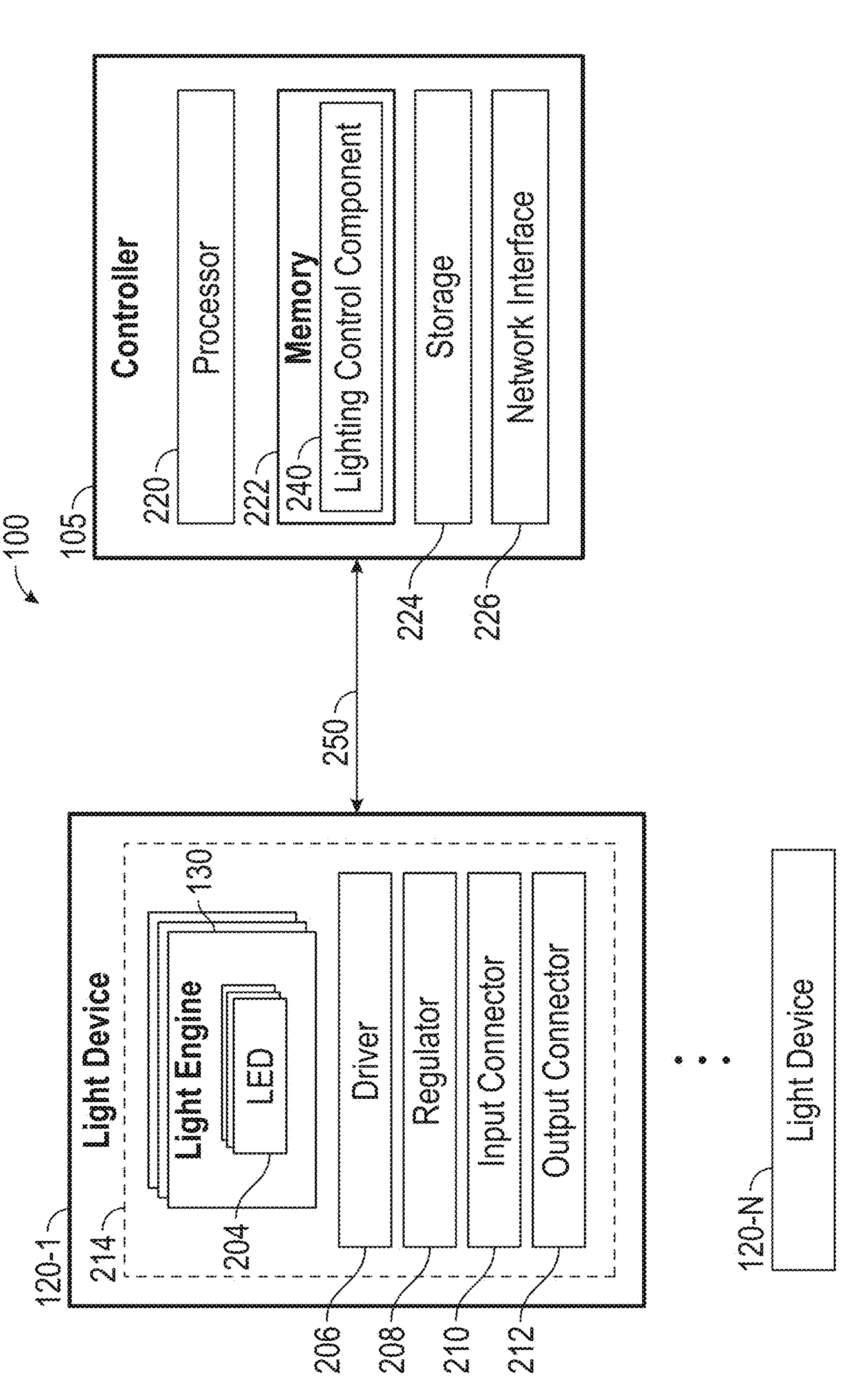
FIG. 2 further illustrates a light device and a controller of the lighting system illustrated in FIG. 1, according to one embodiment.

FIG. 2 further illustrates additional details of the light device 120 (a plurality of light devices 120-1 . . . N is shown) and the controller 105 of FIG. 1, according to one embodiment. As shown, the controller 105 includes, without limitation, a processor 220, a memory 222, a storage 224, and a network interface 226.

The processor 220 represents any number of processing elements, which can include any number of processing cores. The memory 222 can include volatile memory, non-volatile memory, and combinations thereof. The memory 222 generally includes program code for performing various functions for controlling lighting via the light devices 120. The program code is generally described as various functional "components" or "modules" within the memory 222, although alternate implementations may have different functions or combinations of functions. Here, the memory 22 includes a lighting control component 240 (e.g., software component or logic), which may control the light devices 120-1 to 120-N using one or more techniques described herein. In certain embodiments, the lighting control component 240 may perform lighting control in accordance with a lighting control protocol/standard, such as the United States Institute for Theatre Technology (USITT) DMX512-A defined by American National Standard (ANSI) Entertainment Technology.

The storage 224 may be a disk drive storage device. Although shown as a single unit, the storage 224 may be a combination of fixed and/or removable storage devices, such as fixed disc drives, removable memory cards, optical storage, network attached storage (NAS), or a storage area network (SAN). The network interface 226 may be any type of network communications interface (e.g., serial interface, such as serial recommended standard (RS) 232) that allows the controller 105 to communicate with light devices 120 in the system 100, e.g., via cabling (or cable or wire) 250.

Each light device 120-1 to 120-N may include, without limitation, one or more light engines 130, a driver 206, a regulator 208, an input connector 210, and an output connector 212. In certain embodiments, the light engines 130, driver 206, regulator 208, input connector 210, and output connector 212 may be disposed on a single printed circuit board (PCB) 214. The PCB 214 may be a metal core PCB and may provide thermal management for the light device 120. In certain embodiments, the power level of each light device 120 may be 24 volts direct current (VDC), which may allow for a large number of light devices 120 to be used within a lighting configuration as well as improve voltage regulation on the light device 120.

The light engine 130 may include one or more LEDs 204, where each LED 204 is a single color emitter. In certain embodiments, the light engine 130 includes four LEDs 204 (e.g., red, green, blue, and white (RGBW) single color emitters). The LEDs 204 may be arranged in a manner that allows blending of the light emission from the LEDs 204 with or without optics, reduction of unintended phosphor excitation between LEDs 204, thermal management of the LEDs 204, or a combination thereof. For example, with four LEDs 204, the LEDs 204 may be arranged in a quadrangle (or quad) (e.g., rectangular or square arrangement), an example of which is shown in further detail herein with respect to FIG. 6. The light engine 130 may be a broad spectrum light engine or narrow spectrum light engine and may have any wavelength including infrared (IR) and ultraviolet (UV). Each light engine 130 may compose a single lighting pixel as part of a larger lighting configuration/lighting apparatus. In some examples, each LED 204 may emit light at 9000 Kelvin (K), have a CRI of approximately 90, and have a forward current target of approximately 100 milliamps (mA). Note, however, that this is an illustrative example and that the light engine 130 described herein may include LEDs with different parameters.

As noted, the number of light engines 130 included within each respective light device 120-1 to 120-N may be different. As an illustrative example, light device 120-1 may include four light engines 130 (each including four LEDs 204), and light device 120-2 may include a single light engine 130 (including four LEDs 204). In certain embodiments, when multiple light devices 120 (with different numbers of light engines 130) are used together in a lighting configuration and/or lighting apparatus, the light engine spacing between the light devices 120 may be maintained, notwithstanding the different numbers of light engines 130 used within the light devices 120.

The driver 206 is generally configured to control each LED 204 within a light engine 130, based on a data signal generated at the controller 105. For example, the controller 105 is connected to a first light device (e.g., light device 120-1) of the N light devices 120 via the cabling 250. The controller 105 may send a data signal (e.g., DMX data signal) to the first light device (e.g., light device 120-1) to control one or more of the N light devices 120. The driver 206 of the first light device may accept the data signal and pass the signal to each light device 120 in the configuration. Note, the respective drivers 206 of the light devices 120 may be connected in parallel to the data signal chain, such that the failure of a single driver 206 does not interrupt the chain.

In certain embodiments, the driver 206 is a multiple channel (e.g., 4-channel) constant current LED driver integrated circuit (IC) with integrated lighting control and single-line auto-addressing functionality. The driver 206 may perform lighting control in accordance with a lighting control protocol/standard, such as the USITT DMX512-A defined by ANSI Entertainment Technology. The driver 206 may be configured to allow multiple light devices 120 to be connected in a chain, and pass power, data signals (e.g., DMX512 data signals), and single-line addressing between light devices 120 up to a predefined number of interconnected pixels (e.g., 128 interconnected pixels assuming the configuration of light devices includes 128 light engines 130, each including four LEDs 204).

The driver 206 may be configured to provide individual, discrete dimming control of each LED 204 within a light engine 130, via data signals (e.g., DMX512 data signals). For example, the driver 206 may process data signals from the controller 105 to extract illumination level values for the LED(s) 204 of the light engine 130. The driver 206 may also automatically configure the starting addresses of each LED 204 in a chain, such that each LED 204 can be controlled via a unique address (e.g., DMX512 address). For example, when light devices 120-1 to 120-N are connected, each respective driver 206 may auto-address and assign each LED 204 within its respective light engine 130 a unique address. Additionally, in certain embodiments, power and data signals may be routed via the light devices 120, such that the failure of a single driver 206 does not prevent downstream light devices 120 from operating. While a single driver 206 is depicted within the light device 120-1, in certain embodiments, a respective driver 206 may be included within the light device 120-1 for each light engine 130.

The regulator 208 (e.g., voltage regulator) is generally configured to provide voltage regulation for the light device 120. The regulator 208 may protect the light device 120 to prevent circuit damage in scenarios where the power is switched, or light devices 120 are connected or disconnected. When the light device 120-1 is connected to at least one other light device (e.g., light device 120-2), the regulator 208 may pass power (e.g., 24 VDC or some other voltage supply) between the light devices. Each light device 120 may be connected in parallel to a power supply chain such that failure of a single light device 120 does not interrupt the configuration of light devices.

The input connector 210 and the output connector 212 may allow two PCBs 214 (e.g., two light devices 120) to be mated end-to-end. The input connector 210 and the output connector 212 may be electrically compatible with the controller 105. For example, assuming the controller 105 is a DMX controller, the input connector 210 and the output connector 212 may be electrically compatible with the output of the DMX controller. In such examples, the input connector 210 may be a DMX IN connector and the output connector 212 may be a DMX OUT connector. The light device 120 (e.g., light device 120-1) may use the input connector 210, output connector 212, or a combination thereof to receive addressing signals, data signals, power, or a combination thereof, from the controller 105 or another light device 120. The light device 120 (e.g., light device 120-1) may also use the input connector 210, output connector 212, or a combination thereof to forward addressing signals, data signals, power, or a combination thereof, to another light device 120 (e.g., light device 120-2). In certain embodiments, the input connector 210 may have a plug configuration and the output connector 212 may have a socket configuration.

Figure 3:
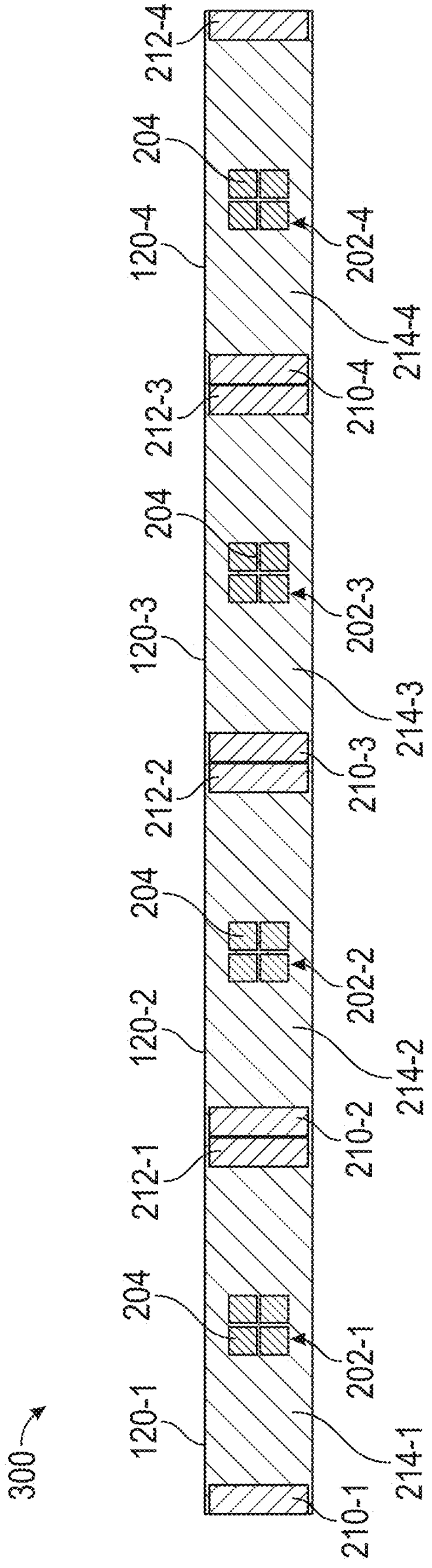
FIG. 3 illustrates an example lighting configuration, according to one embodiment.
Figure 4:
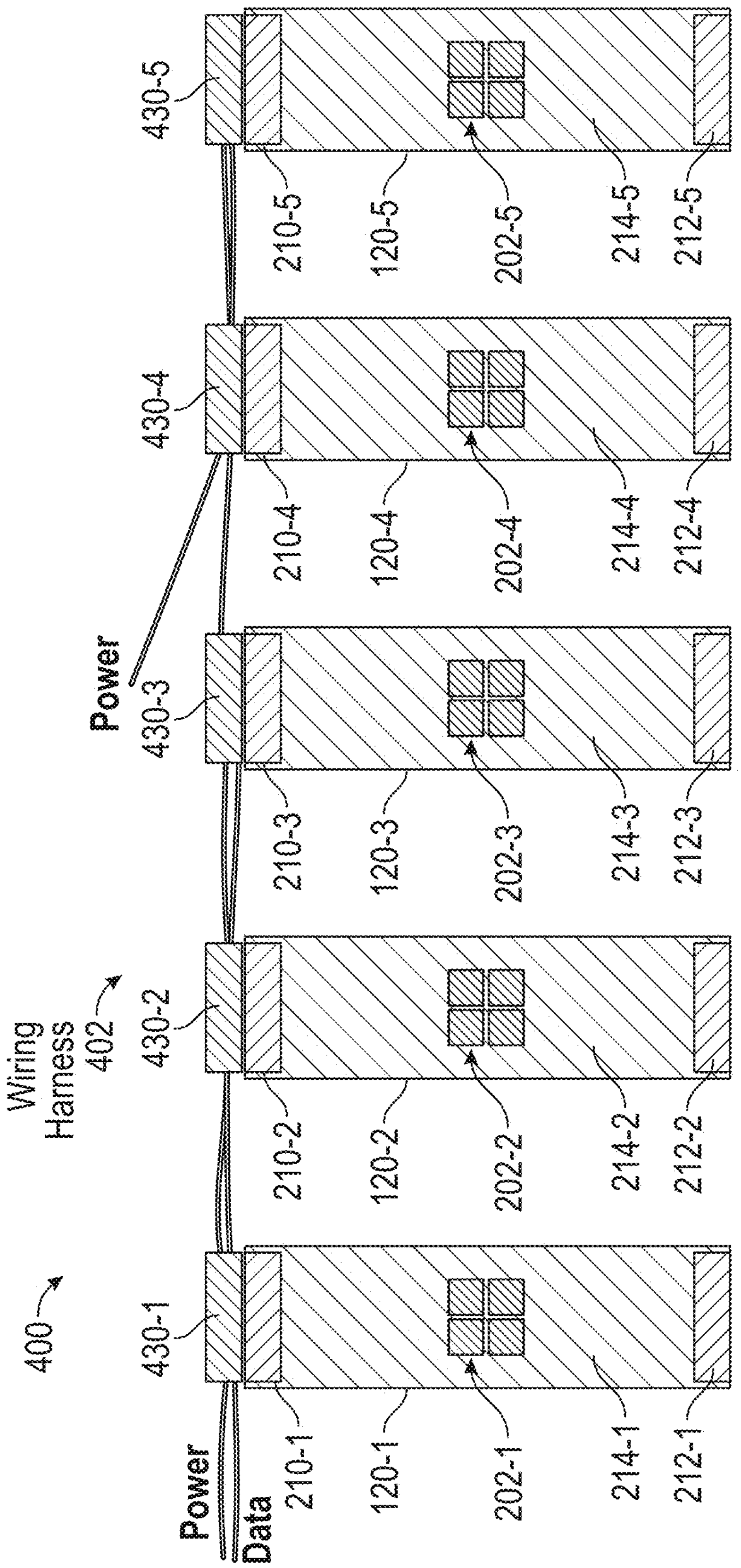
FIG. 4 illustrates another example lighting configuration, according to one embodiment.

The input connector 210 and output connector 212 may enable the light device 120 to be used in different lighting configurations with other light devices 120, including light devices 120 that have the same form factor, light devices 120 that have a different form factor, or a combination thereof. FIGS. 3 and 4, for instance, depict example lighting configurations 300 and 400, according to various embodiments. In the lighting configuration 300, multiple light devices 120-1 to 120-4 are connected in a chain configuration. In the lighting configuration 400, multiple light devices 120-1 to 120-5 are connected in a string configuration.

In a chain configuration, the light devices 120 may be directly connected together utilizing both the input connector 210 and output connector 212. As shown in FIG. 3, for example, the input connector 210-2 of light device 120-2 is directly connected to the output connector 212-1 of light device 120-1, the input connector 210-3 of light device 120-3 is directly connected to the output connector 212-2 of light device 120-2, and the input connector 210-4 of light device 120-4 is directly connected to the output connector 212-3 of light device 120-3. The input connector 210-1 of light device 120-1 or the output connector 212-4 of light device 120-4 may be connected to the controller 105 via cabling (not shown in FIG. 3). The input connector 210 and the output connector 212 may allow for the removal of a light device 120 (e.g., light device 120-3 or another light device) within the lighting configuration 300 without disturbing the other light devices 120. For example, the input connector 210, the output connector 212, or a combination thereof, may be detachable components that can slide onto and/or slide away from the PCB 214 of the respective light device 120. Note that while each light device 120 depicted in FIG. 3 has the same form factor, in certain embodiments, the lighting configuration 300 may include a chain configuration of light devices 120 with the same form factor, light devices 120 with different form factors, or a combination thereof.

In a string configuration, each individual light device 120 may be connected to a matching wiring harness via solely the input connector 210 of the light device 120 (e.g., the output connector 212 of each light device 120 may not be used). As shown in FIG. 4, for example, input connector 210-1 of light device 120-1 is directly connected to connector 430-1 of wiring harness 402, input connector 210-2 of light device 120-2 is directly connected to connector 430-2 of wiring harness 402, input connector 210-3 of light device 120-3 is directly connected to connector 430-3 of wiring harness 402, input connector 210-4 of light device 120-4 is directly connected to connector 430-4 of wiring harness 402, and input connector 210-5 of light device 120-5 is directly connected to connector 430-5 of wiring harness 402. In lighting configuration 400, each input connector 210 may allow for the removal of a light device 120 within the lighting configuration 400 without disturbing the other light devices 120 (e.g., the input connector 210 may be a detachable component that can slide onto and/or slide away from the PCB 214 of the respective light device 120. Note that while each light device 120 depicted in FIG. 4 has the same form factor, in certain embodiments, the lighting configuration 400 may include a chain configuration of light devices 120 with the same form factor, light devices 120 with different form factors, or a combination thereof.

Figure 5:
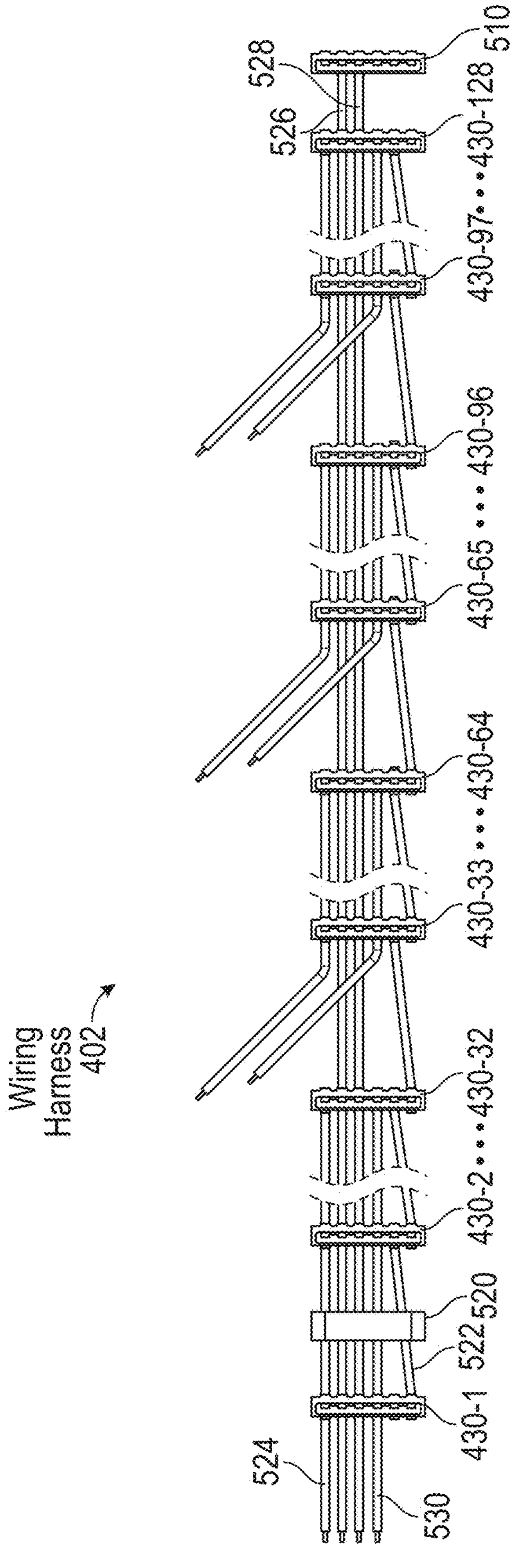
FIG. 5 illustrates an example wiring harness for the lighting configuration illustrated in FIG. 4, according to one embodiment.

In the lighting configuration 400, the wiring harness 402 may pass control (e.g., addressing signals) and data signals (e.g., DMX512 data signals) and power to each light device 120-1 to 120-5 in the lighting configuration 400 via multiple cabling. FIG. 5 further illustrates the wiring harness 402 illustrated in FIG. 4, according to one embodiment. In the depicted embodiment, the wiring harness 402 may include a respective connector 430-1 to 430-128 for each input connector 210-1 to 210-128 of a string configuration with 128 light devices 120. Here, the wiring harness 402 may pass addressing signals (e.g., single-line addressing) between the light devices 120 via cabling 522, pass data signals (e.g., DMX512 data signals) between the light devices 120 via cabling 526 and 528, and pass power between the light devices 120 via cabling 524 and 530. In certain embodiments, as shown in FIG. 5, after a certain number of light devices 120 in the string (e.g., 32 light devices 120 in this example), the wiring harness 402 may allow for additional power to be injected into the string configuration via cabling 524 and 530. In certain embodiments, the wiring harness 402 may include a cable sleeve 520 for organizing and protecting the cabling 522, 524, 526, 528, and 530 and preventing electrical hazards. In certain embodiments, the wiring harness 402 may include a termination component 510 (e.g., wire stop socket component) for terminating the data cabling 526 and 528 after the last light device 120-128 in the string configuration. In DMX implementations, the termination component 510 may be a resistor (e.g., 120 ohm resistor) coupled across the data cabling 526 and 528.

Figure 6:
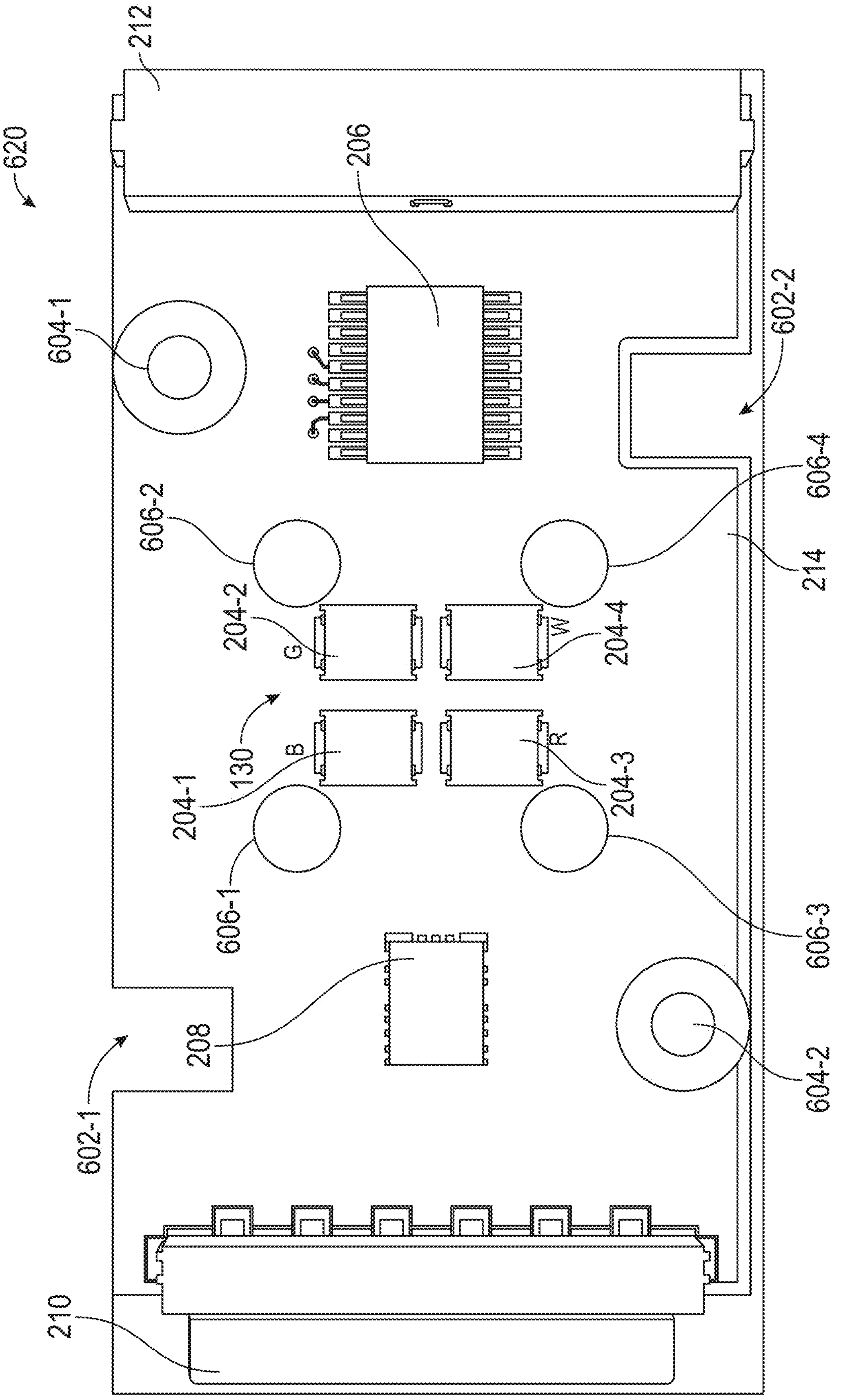
FIG. 6 illustrates an example light device, according to one embodiment.

FIG. 6 illustrates an example light device 620, according to one embodiment. The light device 620 is an illustrative example implementation of the light device 120 described in FIGS. 1 and 2. For example, the light device 620 is illustrative of an example form factor of the light devices 120 within the lighting configurations 300 and 400 illustrated in FIGS. 3 and 4, respectively.

As shown, the light device 620 has a form factor that is rectangular in shape, includes a single light engine 130, an input connector 210 disposed on one (short) side of the PCB 214, an output connector 212 disposed on an opposite (short) side of the PCB 214, a regulator 208 disposed between the input connector 210 and the light engine 130, and a driver 206 disposed between the light engine 130 and the output connector 212. Here, the light engine 130 may be disposed approximately at the center of the PCB 214. Other components of the light device 620 may be placed such that the output from the light engine 130 is not adversely impacted (e.g., shadowed).

In certain embodiments, the light device 620 may include positioning holes that allow an optic or other component to be positioned and secured over the light engine 130. In FIG. 6, for example, the light device 620 includes four positioning holes 606-1 to 606-4 adjacent to the LEDs 204-1 to 204-4, respectively, of the light engine 130. The light device 620 also includes one or more mounting holes 604-1 to 604-2 and slots (or cutouts) 602-1 to 602-2 to allow for attaching the light device 620 to a surface or an enclosure.

Figure 7:
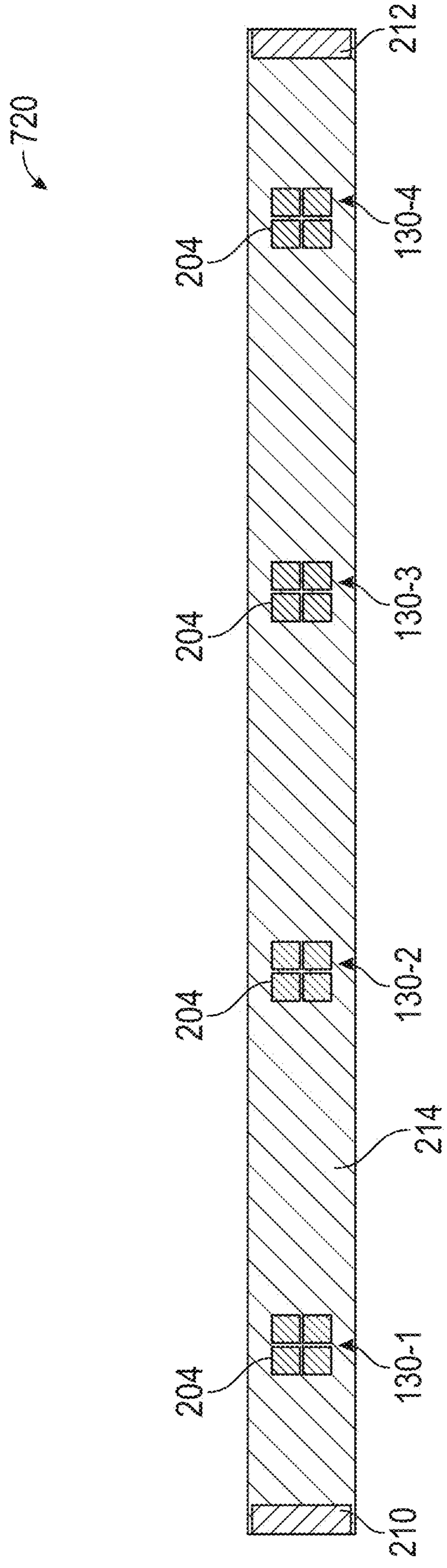
FIG. 7 illustrates another example light device, according to one embodiment.

FIG. 7 illustrates another example light device 720, according to one embodiment. The light device 720 is an illustrative example implementation of the light device 120 described in FIGS. 1 and 2. For example, the light device 720 is illustrative of another example form factor of the light devices 120 that can be used within the lighting configurations 300 and 400 illustrated in FIGS. 3 and 4, respectively.

As shown, compared to the light device 620, the light device 720 has a form factor that includes multiple (e.g., four) light engines 130-1 to 130-4. Although not shown in FIG. 7, in certain embodiments, the light device 720 may include a respective driver 206 disposed on the PCB 214 for each light engine 130-1 to 130-4. In certain embodiments, the light device 720 may include a single driver 206 disposed on the PCB 214 for the light engines 130-1 to 130-4.

Figure 8:
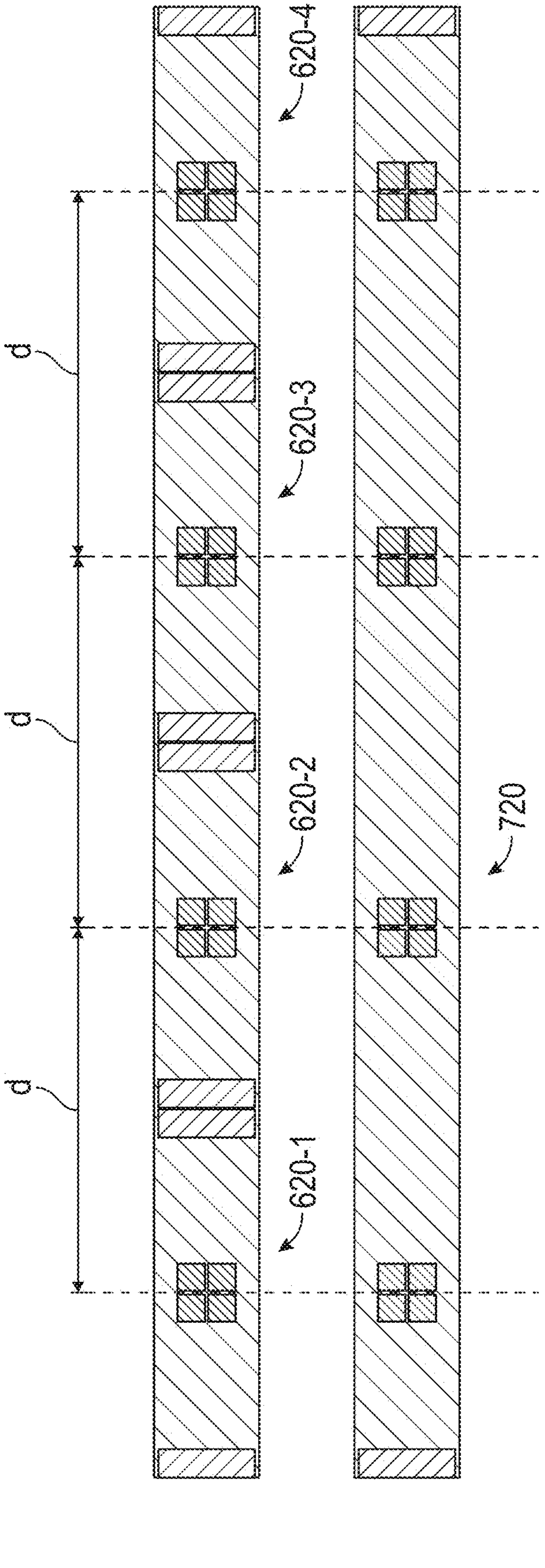
FIG. 8 illustrates an example of spacing between different types of light devices, according to one embodiment.

As noted, in lighting configurations that include multiple light devices 120 with multiple different form factors, the spacing between the light engines 130 within the lighting configuration may be maintained (e.g., the spacing is the same). FIG. 8, for example, depicts an example of the line spacing being maintained in a scenario where four light devices 620-1 to 620-4 are placed adjacent to a single light device 720. As shown, the light engines within light devices 620 and light device 720 are arranged in a grid where the spacing (d) between line engines is consistent. As noted, enabling a consistent line spacing throughout a given configuration/lighting apparatus may allow light devices 120 to be used for lighting effects in which pixel alignment is crucial (e.g., LED displays).

Figure 9A:
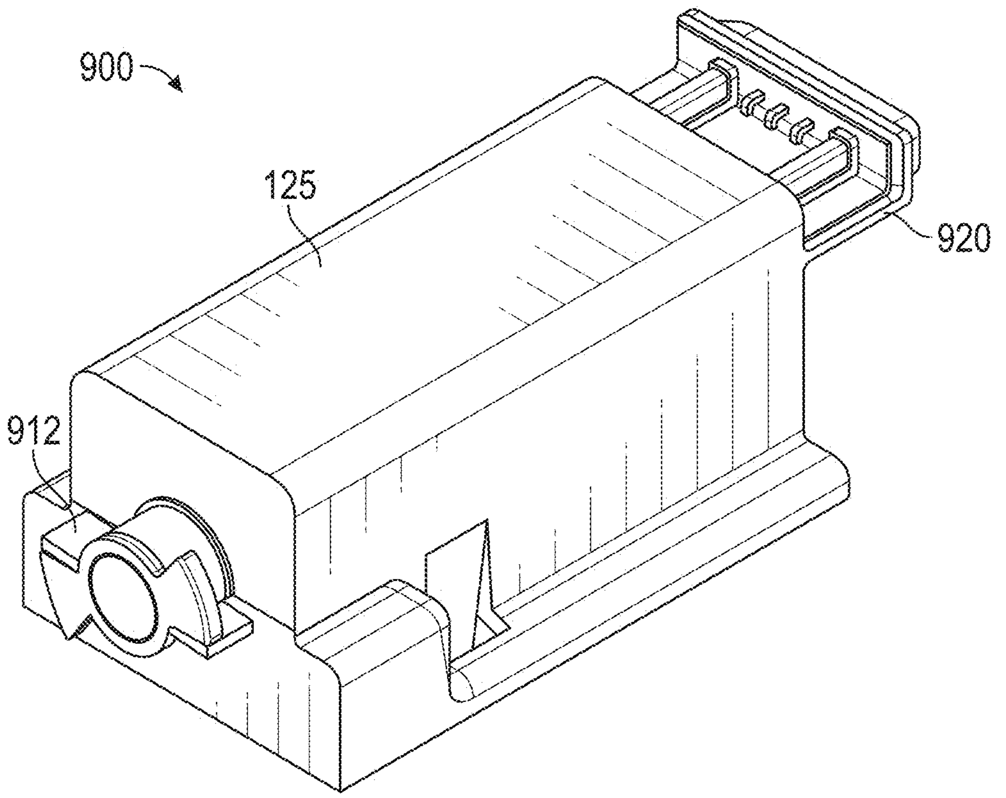
FIGS. 9A-9C illustrate different views of another example light device, according to one embodiment.
Figure 9B:
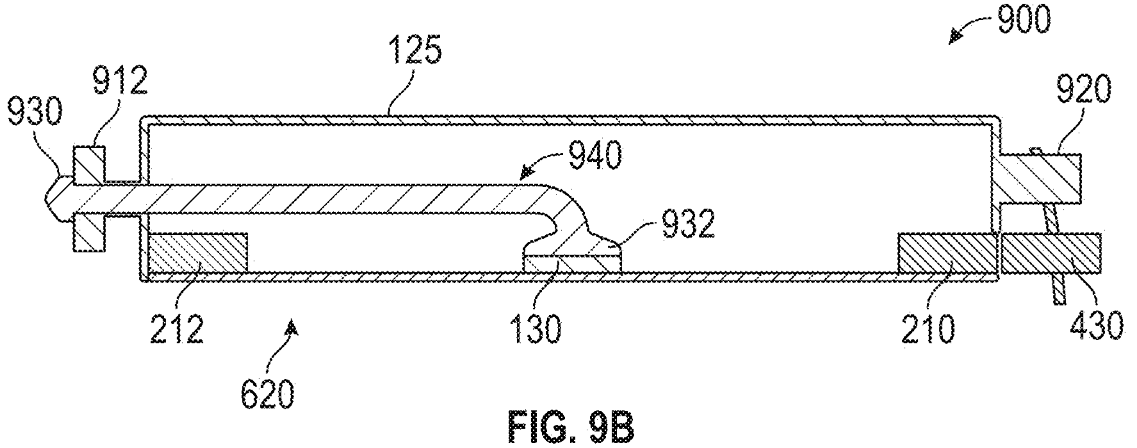
Figure 9C:
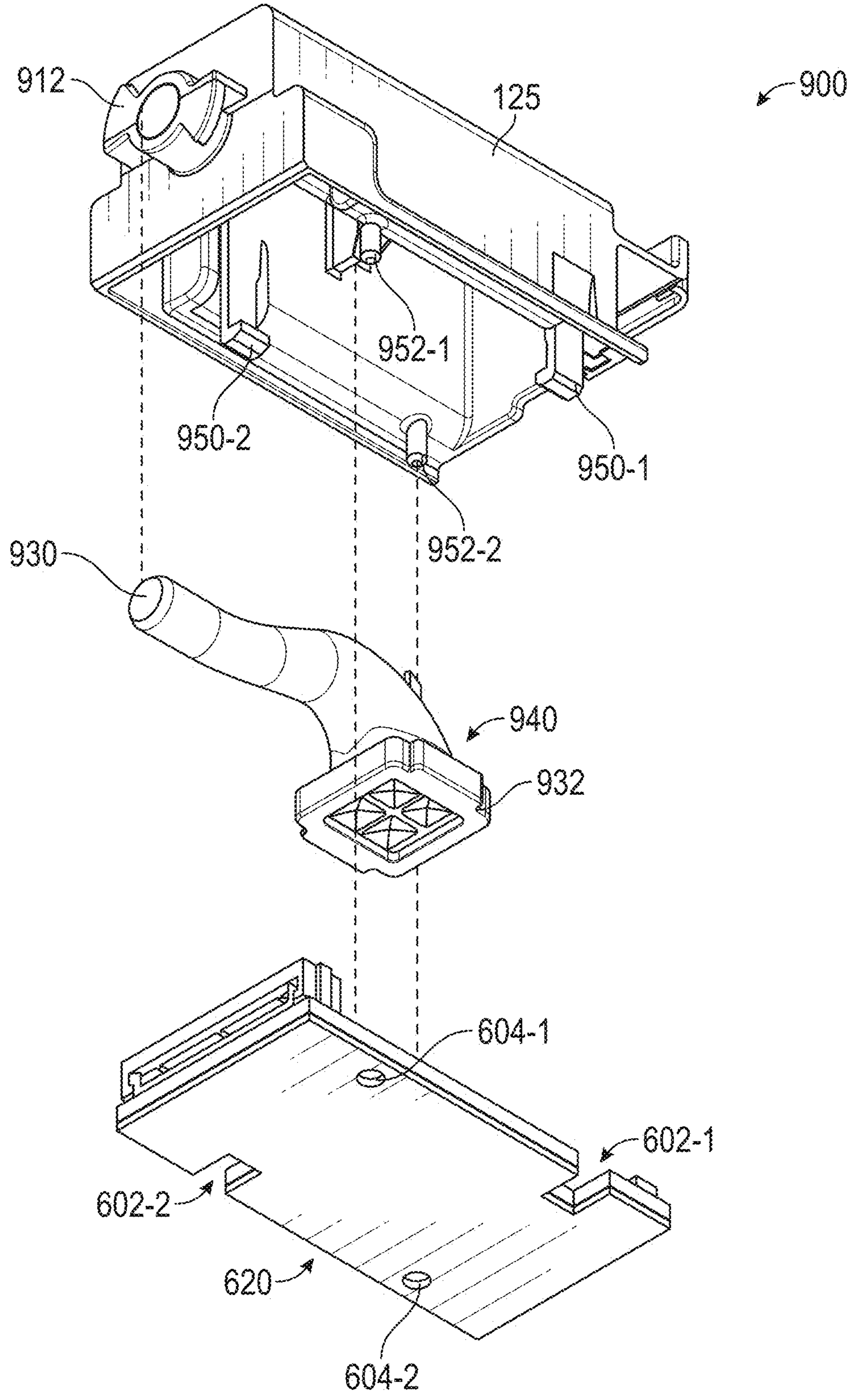

In certain embodiments, one or more light devices 120 may be partially or fully enclosed within a housing (or enclosure) 125. FIGS. 9A-9C illustrate different views of an apparatus 900 that includes a light device 620 enclosed within a housing 125, according to one embodiment. In particular, FIG. 9A depicts a perspective view of the apparatus 900, FIG. 9B depicts a side view of the apparatus 900, and FIG. 9C depicts an exploded perspective view of the apparatus 900, according to one embodiment.

As shown in FIGS. 9A-9C, the apparatus 900 may include a single-piece housing (or enclosure) 125 that can be attached to the light device 620 via the mounting holes 604 and slots 602. For example, as shown in FIG. 9C, the housing 125 may include aligning pins 952-1 to 952-2 that can be inserted into the respective mounting holes 604-1 to 604-2, and may include snap elements 950-1 to 950-2 that can lock onto the PCB 214 of the light device 620 via the respective slots 602-1 to 602-2.

As shown in FIG. 9B, the housing 125 may allow access to the input connector 210 of the light device 620 by another connector (e.g., output connector 212 of another light device or connector 430 of a wiring harness 402). In embodiments where the input connector 210 is attached to a wiring harness 402, the housing 125 may provide mechanical strain relief to the attached wiring harness 402 via the support member 920. Opposite the input connector 210, the housing 125 may include a key mount 912 that allows the light device 620 to lock into a lighting apparatus 110 (e.g., lighting apparatus 110-1, such as a display panel).

As shown in FIGS. 9A-9C, the apparatus 900 includes a light pipe 940 configured to pass light emitted from the light engine 130 from a portion 932 of the light pipe 940 to a portion 930 of the light pipe 940. The light pipe 940 may be formed of any suitable material (e.g., polycarbonate) for passing emitted light. The positioning holes 606-1 to 606-4 of the light device 620 may be used to attach the portion 932 of the light pipe 940 to the light engine 130, such that the total internal reflection (TIR) blending of the emitted light is maximized. The portion 930 of the light pipe 940 may be a diffused, semi-domed feature of the light pipe 940. The light pipe 940 may be configured to provide illumination through the portion 930, based on the emitted light received from the light engine 130 via the portion 932. At least a portion (e.g., portion 930) of the light pipe 940 may be inserted through an opening of the housing 125.

In certain embodiments, at least a portion of the housing 125 may be sealed to form a watertight enclosure. For example, the opening of the housing 125 through which the portion 930 of the light pipe 940 extends may be sealed to prevent water, dust, and other foreign bodies from entering the housing 125. In such embodiments, the apparatus 900 may be configured for a particular ingress protection (IP) rating.

Note that while FIGS. 9A-9C depict a housing 125 being used to form an enclosure over light device 620, in certain embodiments, a similar housing 125 may be used to form an enclosure over light device 720.

Figure 10:
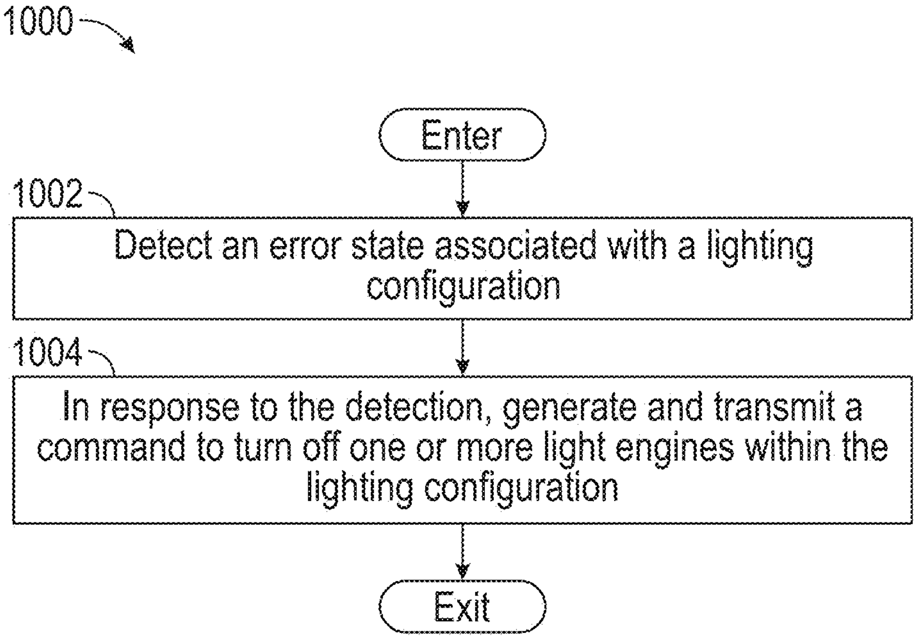
FIG. 10 is a flowchart of a method for controlling one or more light devices, according to one embodiment.

FIG. 10 is a flowchart of a method 1000 for controlling one or more light devices 120 (e.g., light devices 620 and/or 720), according to one embodiment. The method 1000 may be performed by a controller (e.g., controller 105).

Method 1000 may enter at block 1002, where the controller detects an error state associated with a lighting configuration. The lighting configuration may include multiple light devices (e.g., light devices 620, light devices 720, or a combination thereof). The lighting configuration may a single lighting configuration among multiple lighting configurations deployed in an environment.

In certain embodiments, detecting the error state (at block 1002) may include determining a source of the error state (e.g., which light engine 130 is the source of the error state). For example, the controller may receive an indication from the driver (e.g., driver 206) associated with the light engine (that is the source of error state) that the particular light engine has encountered an error state. In some embodiments, the driver associated with the light engine that is the source of the error state may generate the indication, which may then be passed upstream driver by driver until it reaches the controller.

In certain embodiments, detecting the error state (at block 1002) may include: comparing a data output from a terminal (or ending) light device in the lighting configuration with a data input to an initial (or beginning) light device in the lighting configuration; and determining the error state has occurred when the data output is different from the data input.

At block 1004, the controller may generate and transmit a command to turn off one or more light engines within the lighting configuration, in response to the detection at block 1002. For example, in some cases, when the controller has determined the source of the error, the controller may turn off the light engine in the light device that is the source of the error. In some cases, the controller may turn off the entire lighting configuration, e.g., to prevent the lighting configuration from behaving in an unexpected manner.

As used herein, "a processor," "at least one processor," or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory," or "one or more memories" generally refers to a single memory configured to store data and/or instructions or multiple memories configured to collectively store data and/or instructions.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A lighting apparatus comprising:

a first light device and a second light device, each of the first light device and the second light device comprising:

a printed circuit board (PCB);

an input connector disposed at a first side of the PCB;

an output connector disposed at second side of the PCB;

one or more light engines disposed on the PCB between the input connector and the output connector, each light engine of the one or more light engines comprising a plurality of light emitting diodes (LEDs); and one or more drivers disposed on the PCB, each driver of the one or more drivers being configured to control illumination emitted from a respective light engine of the one or more light engines, wherein the input connector of the first light device or the second light device is configured to directly connect to the output connector of the other of the first light device or the second light device.

2. The lighting apparatus of claim 1, wherein each driver is configured to individually control illumination emitted from each LED of the plurality of LEDs within the respective light engine.

3. The lighting apparatus of claim 1, wherein the input connector of the first light device or the second light device is directly connected to the output connector of the other of the first light device or the second light device.

4. The lighting apparatus of claim 1, wherein the input connector of the first light device or the second light device is further configured to connect to a wiring harness.

5. The lighting apparatus of claim 1, wherein the input connector of the first light device or the second light device is further configured to connect to a controller via at least one cable.

6. The lighting apparatus of claim 1, wherein at least one of the first light device or the second light device further comprises a housing attached to the PCB, the housing forming an enclosure around the input connector, the output connector, the one or more light engines, and the one or more drivers.

7. The lighting apparatus of claim 6, wherein the at least one of the first light device or the second light device further comprises one or more light pipes at least partially enclosed by the housing, each light pipe having (i) a first portion disposed on and aligned with a respective light engine of the one or more light engines and (ii) a second portion partially disposed outside of the housing at the first side of the PCB.

8. The lighting apparatus of claim 7, wherein each of the one or more light pipes is configured to pass light emitted from the respective light engine from the first portion to the second portion.

9. The lighting apparatus of claim 1, wherein a number of the one or more light engines in each of the first light device and the second light device is one.

10. The lighting apparatus of claim 1, wherein a number of the one or more light engines in each of the first light device and the second light device is four.

11. A lighting apparatus comprising:

a plurality of light devices, wherein each light device of the plurality of light devices comprises:

a printed circuit board (PCB);

an input connector disposed at a first side of the PCB;

an output connector disposed at second side of the PCB;

a light engine disposed on the PCB between the input connector and the output connector, the light engine comprising a plurality of light emitting diodes (LEDs);

a driver configured to control illumination emitted from the light engine; and a housing attached to the PCB and forming an enclosure around the input connector, the output connector, the light engine, and the driver, wherein the input connector of a first light device of the plurality of light devices or a second light device of the plurality of light devices is configured to directly connect to the output connector of the other of the first light device or the second light device.

12. The lighting apparatus of claim 11, wherein each light device of the plurality of light devices further comprises a light pipe configured to pass light emitted from the plurality of LEDs of the light engine from a first portion of the light pipe to a second portion of the light pipe, wherein the first portion of the light pipe is aligned with the light engine and the second portion of the light pipe partially extends through an opening of the housing at the second side of the PCB.

13. The lighting apparatus of claim 11, further comprising a wiring harness comprising a plurality of connectors, each connector of the wiring harness being configured to connect to a respective input connector of a respective light device of the plurality of light devices.

14. The lighting apparatus of claim 13, wherein the wiring harness is configured to provide power, data signals, and addressing signals to each of the plurality of light devices.

15. The lighting apparatus of claim 11, wherein each light device of the plurality of light devices further comprises a voltage regulator disposed on the PCB between the input connector and the output connector.

16. The lighting apparatus of claim 11, wherein an amount of spacing between each light engine within the plurality of light devices is the same.

17. A lighting apparatus comprising:

a first light device and a second light device, each of the first light device and the second light device comprising:

a printed circuit board (PCB);

an input connector disposed at a first side of the PCB;

an output connector disposed at second side of the PCB;

a first light engine coupled to the PCB comprising a first set of light emitting diodes (LEDs);

a second light engine coupled to the PCB comprising a second set of LEDs;

a first driver in communication with the first light engine and configured to control illumination emitted from the first set of LEDs; and a second driver in communication with the second light engine and configured to control illumination emitted from the second set of LEDs, wherein the input connector of the first light device or the second light device is configured to directly connect to the output connector of the other of the first light device or the second light device.

18. The lighting apparatus of claim 17, wherein the first light engine and the second light engine are positioned between the first side and the second side.

19. The lighting apparatus of claim 17, wherein at least one of the first light device or the second light device further comprises:

a first light pipe optically aligned with the first light engine and configured to direct light away from the PCB.

* * * * *